United States Patent
Suilmann et al.

(10) Patent No.: US 6,957,664 B2
(45) Date of Patent: Oct. 25, 2005

(54) PILOT CONTROL VALVE

(75) Inventors: Franz-Heinrich Suilmann, Laer (DE); Sebastian M. Mundry, Ludinghausen (DE); Patrick Hantke, Aachen (DE); Torsten Boldt, Aachen (DE)

(73) Assignee: DBT Automation GmbH, Lunen (DE)

( * ) Notice: Subject to any disclaimer, the term of this patent is extended or adjusted under 35 U.S.C. 154(b) by 260 days.

(21) Appl. No.: 10/354,524

(22) Filed: Jan. 30, 2003

(65) Prior Publication Data

US 2003/0140974 A1 Jul. 31, 2003

(30) Foreign Application Priority Data

Jan. 31, 2002 (DE) .......................... 102 03 886

(51) Int. Cl.$^7$ ............................. F16K 11/048

(52) U.S. Cl. ................. 137/625.26; 137/625.6

(58) Field of Search ............. 137/625.26, 625.25, 137/625.6, 625.2

(56) References Cited

U.S. PATENT DOCUMENTS

| | | | |
|---|---|---|---|
| 2,716,425 A | | 8/1955 | Yarber |
| 3,636,978 A | * | 1/1972 | Byers .................. 137/625.26 |
| 3,921,660 A | | 11/1975 | Kowalski |
| 4,840,198 A | * | 6/1989 | Ott ...................... 137/625.64 |

FOREIGN PATENT DOCUMENTS

| | | |
|---|---|---|
| DE | A-2253704 | 4/1974 |
| EP | 0 848 166 A1 | 6/1998 |

* cited by examiner

Primary Examiner—Kevin Lee
(74) Attorney, Agent, or Firm—Cook, Alex, McFarron, Manzo, Cummings & Mehler, Ltd.

(57) ABSTRACT

The present invention relates to a pilot control valve, especially for use in mining hydraulics. The valve has a valve insert constructed as a valve cartridge, whose single or multipart valve housing has an input entry 17 for pressure fluid P, a connection opening 18 for a load connection A, an output opening 19, opening into the return flow T and an axial boring 21 to accept a valve closing body 20 provided with a closing surface, which can be lifted from a valve sealing seat 31 arranged between the entry opening 17 and the connection opening 18 by means of an electro-magnetic or piezo-electric switching device which can be fastened onto the valve housing. With the lifting movement of the valve closing body 20 from the valve sealing seat 31 is coupled an at least two part closing mechanism for their separation arranged between the connection opening 18 and the output opening 19. In accordance with the present invention a single part valve closing body 20 is provided, having the sealing surface in the form of a collar 28 and the moving part of the closing mechanism in the form of a shaft section 22, whereby the shaft section 22 enters into a boring section 21C of the axial boring 21 during the lifting movement, closing a radial opening 39. The valve sealing seat 31 can be exchanged with a valve sleeve 130 and the nominal bore of the pilot control valve can be changed by means of a throttle 47.

19 Claims, 3 Drawing Sheets

PILOT CONTROL VALVE

BACKGROUND OF THE INVENTION

The present invention relates to a pilot control valve especially for use in mining hydraulics with a valve insert configured as a valve cartridge which can be arranged in the valve accepting boring of a valve block or similar forming a multi-way valve whose valve housing has an inlet for pressure fluid, a connecting opening for a load, an outlet opening into a return feed and an axial boring for the acceptance of a valve closing body provided with a sealing surface, which can be lifted by means of a switching device fixed to the valve housing, against the return force of a spring from a valve sealing seat arranged between the inlet opening and the connecting opening, whereby with the lifting movement of the valve closing body from the valve sealing seat an at least two part closing mechanism arranged between the connecting opening and the outlet opening is coupled for their separation.

Previously proposed pilot control valves are employed in underground mining for the switching of main control valves arranged after them with which then hydraulic working cylinders of advancing support frames or other hydraulic equipment can be actuated. Due to the high working pressure and the corrosion promoting underground atmosphere, severe requirements are placed upon valves employed underground in respect of their switching power, switching distance and construction. In mining hydraulics the switching devices in the main comprise electromagnetic actuators which are designed to be intrinsically safe and are connected to corresponding electrical circuits. Using intrinsically safe electro-magnetic switching devices, the switching power which can be applied and the switching distance which is available for actuation is limited.

A previously proposed pilot control valve is known from DE 92 11 629 U1. It has a three part valve closing body which comprises two valve closing elements with cone shaped sealing surfaces and a coupling rod, which are accepted axially parallel to each other and with cone surfaces facing each other in a housing part comprising two valve housing parts screwed together to form a cartridge in which they can move too and fro. Each housing part has a valve seat associated with one of the closing surfaces and the distance of the valve seats from each other can be adjusted by the setting of the screw connection between the valve casing parts so as to facilitate an initial and subsequent adjustment of the valve setting. So that dependent upon the valve switching setting in the this pilot control valve a fluid current can take place between the high pressure line and the load or from the load to the return, both the coupling rods and also the valve closing elements are provided on their cylindrical outer surfaces with axially running flats or grooves, which at the same time limit and determine the cross section of flow and consequently the nominal bore of the pilot control valve. The manufacturing effort for the valve sealing elements comprising the valve sealing body and the coupling rod is therefore comparatively high and the functional integrity of this pilot control valve is dependent upon the precise adjustment of the separation of the two valve sealing seats.

It is an aim of the invention to produce a pilot control valve which has short switching paths, is simply constructed and has a simply produced valve sealing body in production engineering terms.

SUMMARY OF THE INVENTION

Accordingly the present invention is directed to a pilot control valve as described in the opening paragraph of the present specification wherein a single part valve closing body has the closing surface and the moving part of the closing mechanism, whereby the moving part comprises a shaft section of the valve closing body which plunges with the lifting movement into a boring section of the axial boring, closing a radial opening. In the pilot control valve according to the invention consequently only the valve seal between the pressure line and the user is made with a completely sealing valve sealing seat and associated closing surface, the valve sealing between the load connection and the return line works in accordance with a different principle and comprises a gap sealing, which from a determined point in the switching separates the connection between the load connector and the return line and requires no adjustment. The use of two different switching and sealing principles not only makes possible the omission of adjustment or re-adjustment, but at the same time simplifies the production engineering effort for the valve closing body, since this can be manufactured from one piece without the expensive matching and coupling surfaces as in a multiple part valve closing body. Owing to the single part valve closing body made as a valve pusher, the switching path and consequently the necessary valve lift is extremely short.

In a preferred embodiment the valve closing body has a ring-shaped collar whose rear side facing the valve sealing seat forms the closing surface or the support surface for a sealing body. The ring-shaped collar is simply manufactured and makes for a further simplification of construction of the valve closing body since expensive cone shaped closing surfaces on the valve closing body can be dispensed with. The preferably flat rear side of the ring shaped collar can hereby itself form the closing surface abutting the valve sealing seat or serve as a supporting surface for a sealing body, which can possibly b e exchanged in the event of wear. In order to increase the sealing function of the closing surface and to reduce the liability to wear, the collar can be equipped with an additional seating material on its rear side. The ring shaped collar which is impacted in the closed position of the pilot control valve with the pressure from the pressure line effects an automatic closing of the pilot control valve itself when the return spring fails or the actuator of the switching device blocks the free movement of the valve closing body.

Preferably the shaft section, i.e. the moveable part of the closing mechanism, forms one end of the valve closing body and a pin section forms the other end of the valve closing body whereby the pin and the shaft sections have the same diameter and form the guide surfaces of the valve closing body in the boring sections of the axial boring. Both can be provided with a sealing ring groove for the acceptance of an O-ring or a sliding ring. The measures quoted have the advantage that the valve closing body is guided by the shaft and the pin section in the axial boring of the valve housing and owing to the mutually matched diameters a pressure equalised opening position of the valve closing body can be achieved with the collar lifted from the sealing seat.

Advantageously the valve closing body has a diameter reducing cut-out with a conical transition section to the shaft section and/or collar between the collar and the shaft section forming the moving part of the closing mechanism. In a preferred embodiment the valve sealing seat is a component an exchangeable valve sleeve which can be inserted, especially pressed, into blind boring extensions of the axial boring. By means of the exchangeable valve sleeves not only is maintenance of the pilot control valve eased but the possibility exists with an otherwise unchanged construction of pilot control valve of matching the material of the valve sealing seat and/or the geometry of the valve sealing seat to the specific application profile of the pilot control valve. Preferably the internal diameter of the valve sleeve at the valve sealing seat is essentially the same diameter as the shaft and the pin sections and forms the inner side of the valve sleeve sections of the axial boring.

The arrangement of the exchangeable valve sealing seat depends on the construction of the valve case. In a prefered embodiment the valve case comprises a single case part with a stepped blind hole extension, in which a valve sleeve is inserted the sleeve end of which inserted into the blind hole forms the valve sealing seat with its inside and has the radial opening between two boring sections at a distance from the valve sealing seat, whereby preferably the radial opening opens into a circulating groove on the inner side of the valve sleeve. In a single part valve housing, adjustment of the valve setting is not possible since the distance established between the valve sealing seat and the radial opening by the construction of the valve sleeve determines the switching path the pilot control valve. At the same time however the risk of assembly errors is reduced to a minimum since the exact setting of the switching path is established exclusively by the matching between the switching pin of the switching device, the valve sleeve encompassing the valve sealing seat and the valve closing body inserted and guided therein. The groove on the inner side of the valve sleeve can in a modification of the valve sleeve embodiment also be constructed in that the valve sleeve is made stepped on the inside and the circulating grove is formed by means of an, especially screwed in, valve sleeve insert in the steps of the valve sleeve which is made shorter than the depth of the step, so that between the end of the valve sleeve insert and the bottom of the step a groove is formed.

In an alternative embodiment the valve case can comprise a first case part and a second case part joined to it, especially screwed, which is provided with a stepped bind hole extension, in which from the separation plane between the first and second parts a valve sleeve is inserted, whose free end forms the valve sealing seat and between its other end and the stepped section of the blind hole extension, forms the radial opening by means of gap openings at the sleeve end or the extension of the length of the valve sleeve between the abutment surface of a ring shoulder of the sleeve and the base of the sleeve is shorter than the stepped blind hole extension so as to form an annular gap as the radial opening via the shorter sleeve length. With a two-part construction of the valve casing the valve adjustment has a matching chain with four contact positions, whereby as opposed to the form of construction with a single part valve part, the first separation plane forms the additional fourth contact position.

In a third alternative embodiment the valve case comprises a first, a second and a third part of the case with a first separation plane between the first and second and a second separation plane between the second and third case parts, whereby the second case part is provided with a stepped blind hole extension, into which a free sleeve end of a valve sleeve forming a valve sealing seat at its free sleeve end is inserted. In this configuration it is especially favourable if the radial opening is formed from an intermediate gap at the second separation plane. In contrast to the form of construction with a single part or two-part valve case in the three part valve case the radial opening is not a component of the valve sealing seat, but it is for instance generated as an intermediate space or annual gap by the separation plane between two parts of the case. It is further expedient in all the forms of construction to provide at least one decentral through boring for driving out the valve sleeve. It is understood that this can be closed by means of a blanking plug, a grub screw or similar.

The application possibilities and the range of use of the pilot control valve according to the invention can be further increased as opposed to the known pilot control valves if a flow resistance for the fluid is connected in series with the valve sealing seat and the closing mechanism, since then with a single form of construction of the pilot control valve its effective nominal bore can be changed. In contrast to the known pilot control valves in accordance with the invention the seating geometry of the valve sealing seat between the pressure line and the load is not carried out differently to change the nominal bore but the effective nominal bore is controlled by the selection of the flow resistance. A flow resistance can be especially simply produced using a throttle or a shutter whereby preferably a single throttle or shutter is allocated to the load connector so that this one flow resistance is effective both in the feed flow from the pressure line to the load and also in the return flow from the load into the return line. It is also possible however to arrange a separate throttle or shutter for each connection or only one or two connections are provided with a flow resistor. In the preferred embodiment the throttle or shutter is inserted at a distance from the valve closing body in a cover boring or similar in the valve case which forms the load connection. By this arrangement there results a reduction of the flow forces acting upon the valve closing body.

As the switching device preferably an electro-magnetic or piezo-electric actuator is applied as is described in DE 101 34 947, the two which express reference is made, whereby preferably the valve insert is retained in the valve accepting boring by means of the switching device. With the fastening of the switching device to the valve block the valve insert is then immediately accommodated axial and secured in the valve accepting boring. In a multipart valve case the boring sections of the axial boring forming the guide and bearing sections for the shaft and the pin sections can be provided in each outer case part with an accepting groove for a sealing ring on the case side.

BRIEF DESCRIPTION OF THE DRAWINGS

Example of pilot control valves made in accordance with the present invention will now be explained with reference to the accompanying drawings, in which.

DETAILED DESCRIPTION OF THE INVENTION

Figure 1:
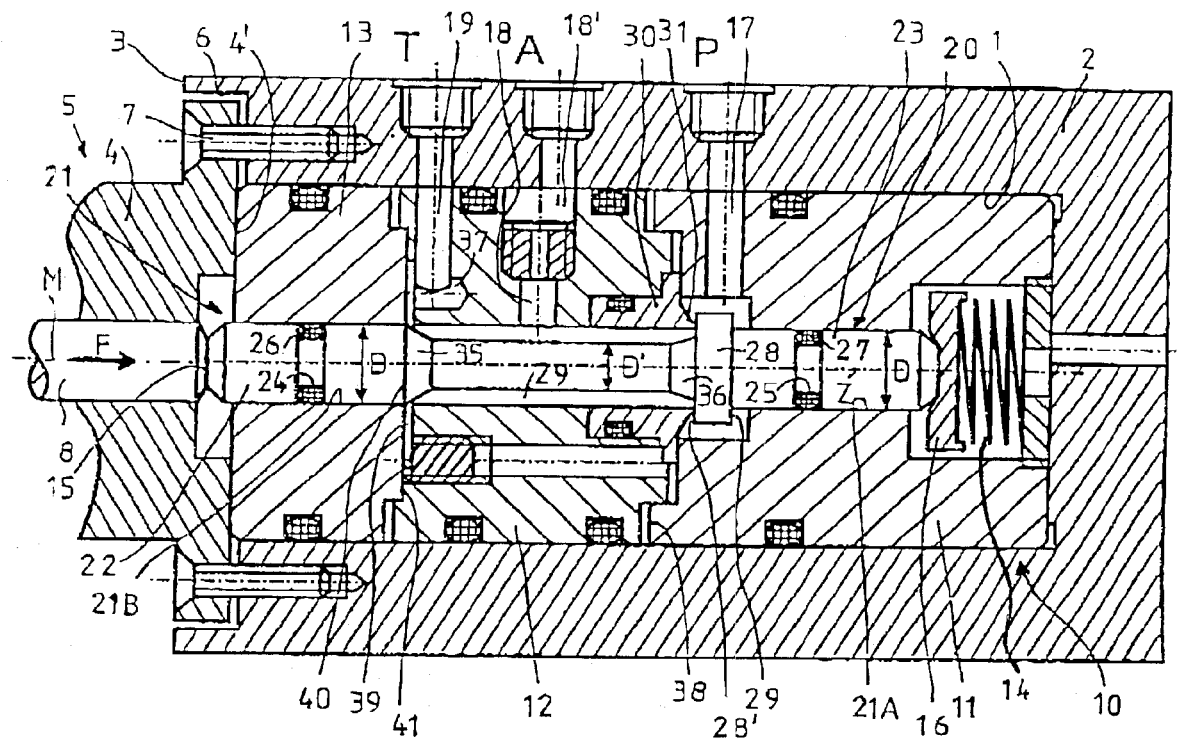
FIG. 1 shows a cross-sectional view of a pilot control valve in accordance with a first embodiment, inserted into a valve block and held in position in the valve accepting boring by the housing of the switching device.

FIG. 1 shows a vertical section through a valve accepting boring 1 of a valve block 2 possibly having several adjacent and superimposed valve-accepting borings. The valve accepting boring 1 is made as a blind hole into which a pilot control valve 10 made as a cartridge shaped valve insert according to a first embodiment is pushed in from the end 3 of the valve block 2. The valve insert forming the pilot control valve 10 has a three part valve case with a first valve case part 11, a second valve case part 12 and a third valve case part 13 which are screwed together individually at their separation planes 38 and 41 and are held together in the valve acceptance boring 1 by means of the case 4 of the switching device 5 indicated only schematically. The case end 4' of the switching device 5 sits in a depression 6 on the end 3 and overlaps the cartridge of the pilot control valve 10 with a fastening flange and is screwed into the walls of the valve block 2 by means of fastening screws 7. The switching device 5 has a switching pin 8, which can be impacted electro magnetically or piezo electrically with a switching force F in the direction of the arrow so as to change the closing position of the pilot control valve 10. The central axis M of the cylindrical switching pin 8 is aligned with the central axis Z of the valve insert 10 and the accepting boring 1 and the free end of the switching pin 8 presses against the end surface 15 of a valve closing body 20 comprising a single piece, which is pre-tensioned against the switching force F by means of a return spring 14. In the embodiment according to FIG. 1 the valve closing body 20 sits in a moveable manner in an axial boring 21, which is formed individually from a boring section 21A, 21B, 21C in the case parts 11, 12, 13, whereby all the boring sections 21A, 21B, 21C have the same diameter D as each other. The axial guidance and bearing of the one part valve closing body 20 made as a pusher is effected by means of a shaft section 22 forming the left hand end of the valve closing body 20 with a constant diameter D and a pin section 23 forming its right hand end similarly with the diameter D, which are guided with small play in the boring section 21A, 21B or the axial boring 21 in the first case part 11 and the third case part 13. The end of the switching pin 8 works on the end 15 of the shaft section 22 and on the return spring 14 presses against the end of the pin section 23 via the pressure plate 16. Both the shaft section 22 and also the pin section 23 have a circumferential groove 24, 25 for the acceptance of a sealing ring 26, 27 so as to seal the centre boring section 21C or the actual boring 21 against the outside of the valve case.

The pilot control valves shown in the FIGS. are all configured as 3/2 multi way valves and facilitate a connection or separation between the high pressure line P and the load connection A or between this and the return line T. In order to be able to perform the valve function, the first case part 11 has an inlet opening 17, which opens into the pressure line P. The second case part 12 has a connecting opening 18 which opens into the load connection A in the valve block 2, and an outlet opening 19, which leads to the return T in the valve block 2. The embodiments all show the output or rest position of the valve in which the switching pin 8 is not impacted with the force F and consequently the connection between the entry opening 17 and the connector opening 18 is separated. To achieve the fluid separation the valve closing body 20 is provided a circulating collar 28 as a single part on the pin section 23 and extending radially outwards from this, which abuts against the closing edge of a valve-sealing seat 31. The closed position of the rear side 28' of the collar 28 with the closing edge of the sealing seat 31 is provided by on the one hand the return force exerted by the return spring 14 and on the other hand by the closing pressure exerted by the pressure of the pressure fluid in the pressure line P on the ring surface 29 of the collar 28. The shaft of the closing body 21 has a cut out 29 between the rear side 28' or the collar 28 and the shaft section 22, which for instance can result in a constant reduction of the shaft diameter to the diameter D'. The transitional section 35 to the shaft section 22 and the transitional section 36 to the collar 28 rises conically in each case. In the shown valve position of the closing body 20 the connection opening 18 is joined with the exit opening 19 via the cut out 29 and the freely cut surface of the transitional section 35. The output opening 19 hereby does not reach up to the associated section of the axial boring 21 in the case section 12 but is open via a cross boring 37 to the separation plane 41 between the second case part 12 and the third case part 13. Both case parts 12, 13 are screwed together in such a manner that at the separation plane 41 a gap 39 is formed out to the height of the cross boring 37, which in the pilot control valve 10 comprises the static part of a closing mechanism for fluid separation of the connection opening 18 from the exit opening 19. The second moveable part of the closing mechanism comprises the shaft section 22 since its cylindrical outer side plunges into the section 21C of the axial boring 21 when the valve closing body 20 is moved to the right, as seen in the FIG., and then seals the access to the gap 39. The transition edge 40 between the shaft section 22 and the transition section 35 forms a sharp edged control edge for the closing mechanism, which seals the free passage between the connection opening 18 and the outward opening 19 as soon as it is at least at the same position as the end of the second case part 12. The shaft section 22 plunging into the boring section 21C in the case part 12 functions as a gap seal with little flow and pressure loss of fluid from the pressure line P, which can overflow due to the movement of the valve closing body 21 in the direction of the arrow F and of the collar 28 being lifted from the valve sealing seat 31 to the connecting opening A. Since both the shaft section 22 as the moveable part of the second closing mechanism and also the collar 28 as the moveable part of the first closing principle formed as a valve seat are formed as one part with the valve closing body 20 the actuating movement of both closing principles are coupled together by force.

Figure 2:
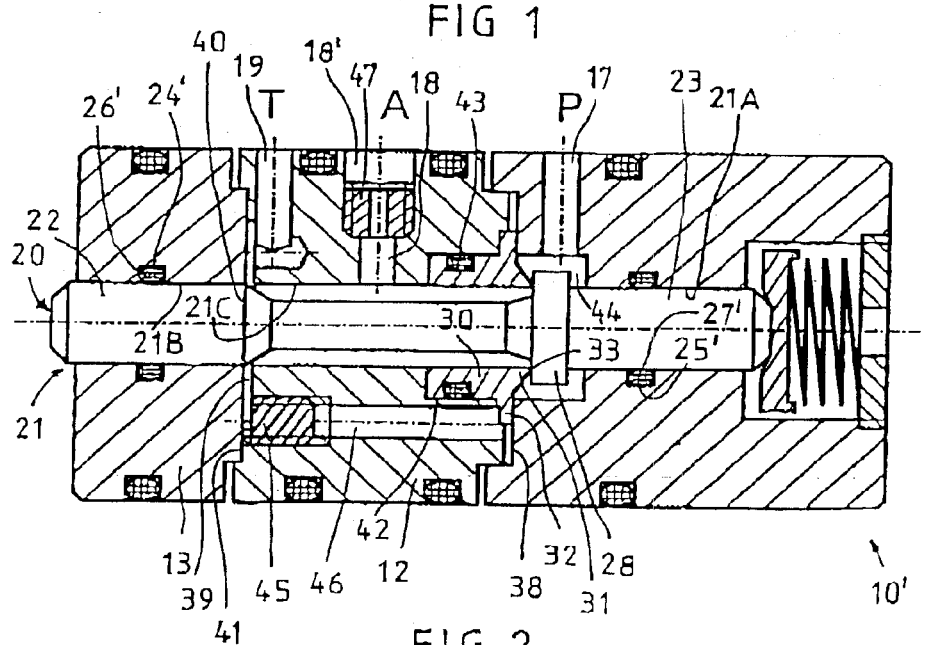
FIG. 2 shows a cross-sectional view of a pilot control valve in accordance with the first embodiment with a changed arrangement of seals for the valve closing body.

For reasons of clarity the further description of the pilot control valve according to the first embodiment is now, continued with reference to FIG. 2, in which similarly a pilot control valve 10' with three case parts 11, 12, 13 is shown. The only difference between the pilot control valve 10 is FIG. 1 and the pilot control valve 10' in FIG. 2 comprises the arrangement of the seals for the shaft section 22 and the shaft section 23 which in the embodiment according to FIG. 2 are each attached on the housing side. The boring section 21A in the first case part 11 and the boring section 21B in the third case part 13 which form the axial guide for the shaft section 22 and the pin section 23 of the valve closing body 20, are correspondingly provided with accepting grooves 24', 25' into which individually a sealing ring 26', 27' sits. The valve-sealing seat 31 is integrated into an exchangeable valve sleeve 30 which is pressed into a blind hole 42 in the second case part 12 extending from the first separation plane 38 between the first case part 11 and the second case part 12 and sealed in place by means of a sealing ring 43. The sealing seat 31 is here formed from the free sleeve end 33 of the valve sleeve 30 at the separation plane 38 extending into a ring shaped front space 44 of the valve. The front space 44 comprises a blind hole formed in the first case part 11 and forms the only local extension of the axial boring 21. The entry opening 17 opens into the front space 44, so that the through flow of fluid from the pressure line P is assured. The front space 44 also forms the free space for the movement of the collar 28 of the valve closing body 20 whereby the fluid at the collar 28 can freely flow passed the rear side 28' of the collar 28. The valve sleeve 30 is provided with a ring shoulder 32 extending out over the side walls of the blind hole 42, which extend radially out to the position of a decentral blind boring 46, via which the valve sleeve 30 can be driven out from the blind hole 42 when the case parts 11, 12 and 13 are disassembled. In the assembled condition the blind boring 46 is closed by means of a blanking plug 45 or a grub screw. The geometry of the sealing seat 31 and the material of the valve sleeve 30 can be varied depending on the pressure to be switched with the pilot control valve and in the embodiments shown the valve-sealing seat 31 on the valve sleeve 30 is made in the form of a cone. When the collar is lifted from the valve sealing seat 31 the fluid flows out of the pressure line P via the entry opening 17 into the advanced area 44, there passed the collar 28 into the annual space formed by the cut out 29 up to the transitional edge 40 to the shaft section 22 and then via the connecting opening 18 which opens into the boring section 21C to the load A (not shown). The closing mechanism between the opening connector 18 and the exit opening 19 separate these owing to the shaft section 22 of the closing body 20 which seals the radial opening 39.

A further special feature of the pilot control valves 10 and 10' in FIGS. 1 and 2 is a throttle 47, which is inserted or screwed in or directly set into the case 12 in a radial cover boring 18' which has a larger cross section than the connecting opening 18 and forms with this the feed to the load connector A. The throttle 47 forms a stream resistance when flowed through by the fluid both from the open valve sealing seat 31, 28 and also from the opened closing mechanism 39, 22. If the throttle 47 has a through flow opening which is smaller than the through flow gap on the valve sealing seat 31, 28 or at the closing mechanism 39, 22, it is possible to determine the effective nominal bore of the pilot control valve 10 or 10' by means of the opening cross section of the throttle 47. By exchanging the throttle 47 for a throttle with a different cross sectional opening the effective nominal bore of the pilot control valve can consequently be varied with otherwise identical construction whereby the distance of the throttle 47 owing to the cover arrangement in the second case part 12 essentially influences the flow in the valve less than would be the case for a changing of the cross section of flow at the valve sealing seat or at the closing mechanism.

Figure 3:
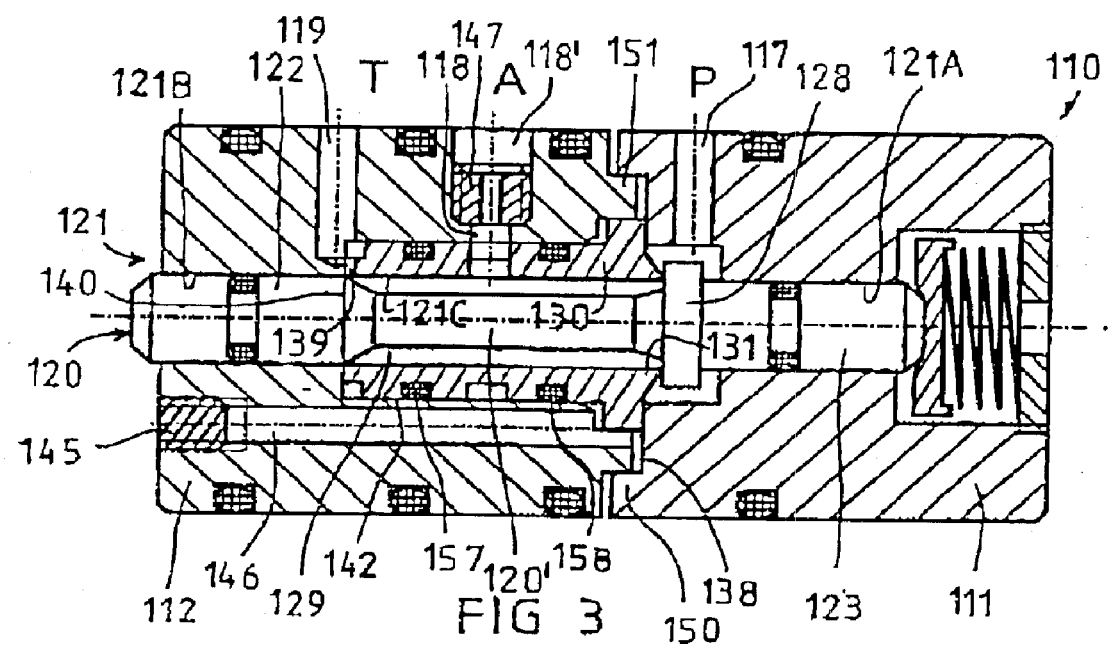
FIG. 3 shows a cross-sectional view of a pilot control valve in accordance with a second embodiment with a two part valve case.
Figures 4A, 4B:
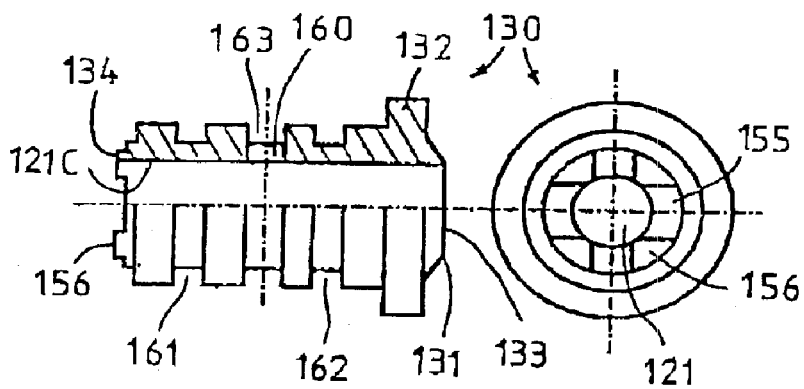
FIG. 4A shows a detailed sectional view of the valve sleeve for the pilot valve shown in FIG. 3.
FIG. 4B shows a view of the left hand sleeve end shown in FIG. 4A.

FIG. 3 shows an embodiment of a pilot control valve 110 according to a second embodiment. The same components are provided with reference numbers raised by 100. The pilot control valve 110 has a two-part valve case with a first valve case part 111 and a second valve case part 112. The construction of the valve closing body 120 with collar 128, transition edge 140 and shaft section 122 is identical as in the first embodiment. Between the first case part and the second case part 112 a single plane of separation 13B is formed, whereby the two case parts 111, 112 are screwed together using threaded sections not shown, on the cover collar 150 of the first case part and on a pin extension 151 of the second case part 112. A sealing of the shaft section 122 and the pin section 123 can, as in the embodiment according to FIG. 1, be effected using sealing rings 126, 127 which are fastened to the valve closing body 120 or by sealing rings which are set into the boring sections 121A and 121B in the case parts 111, 112. In contrast to the first embodiment in the embodiment according to FIG. 3, both the sealing seat 131 and also the fixed part of the closing mechanism formed from the radial opening 139 are integrated into a valve sleeve 130, which is shown in detail in FIGS. 4A and 4B, which are now referred to. The valve sealing seat 131 is formed at the free sleeve end 133 whilst the valve sleeve end 134 extending into the base of the blind hole boring 142 in the second case part 112 (FIG. 3) has several radial cut outs 155 distributed around its circumference, which are interrupted by axial corner extensions 156. With the valve closing body 120 not activated and consequently not moved as shown in FIG. 3, fluid from the annular space 129 formed between the reduced diameter closing body shaft 120' of the valve closing body 120 and the surrounding wall of the axial boring 121 can flow into the exit opening 119 to the return flow T, since the transitional edge 140 is moved towards and to the left of the radial opening 139. The valve-sealing seat 131 is hereby closed by the collar 128. The sealing seat of the sleeve 130 in the blind hole boring 142 is effected by means of two sealing rings 157, 158 (FIG. 3), which sit in the sealing ring grooves 161, 162 (FIG. 4A), which are formed on either side of a connecting boring 160 to the load connection 118. The connecting boring 160 opens into an annular groove 163 on the valve sleeve, so that the connection of the connecting boring 160 to the connecting opening 118 is assured independently of the position of the valve sleeve 130 in the blind hole boring 142. For the exchange of the valve sleeve 130 pressing into the blind hole boring 142 a decentral blind boring 146 (FIG. 3) is provided which is closed with a blanking plug 145.

Figures 5A, 5B:
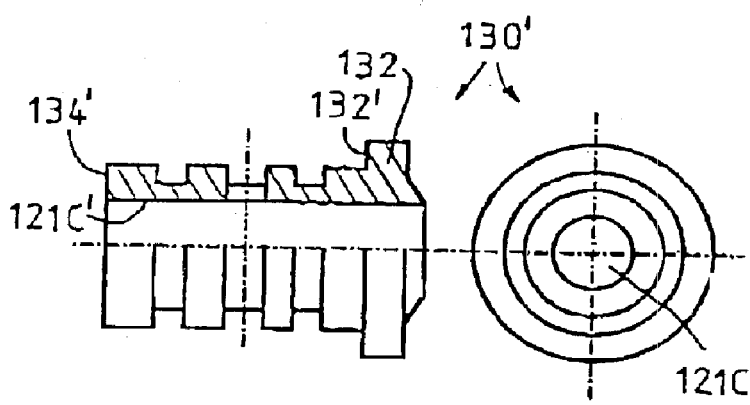
FIG. 5A shows a sectional view of an alternative embodiment of a valve sleeve for use with the pilot control valve made in accordance with the second embodiment.
FIG. 5B shows a view of the left hand sleeve end of the valve sleeve according to FIG. 5A.

FIGS. 5A and 5B show an alternative embodiment for the valve sleeve 130', which can be inserted in the second case part 112 of a two part valve case shown in FIG. 3. The valve sleeve 130' is distinguished from the valve sleeve 130 in its extended length between the abutment flange 132' of the ring shoulder 132 and the sleeve base 134' and/or the configuration of the sleeve base 134', which here is formed as a flat surface so that over the shorter length of the valve sleeve 130' relative to the extended length of the stepped blind hole boring 142 between the base of the blind hole boring 142 and the base 134' of the sleeve 130' an annular gap arises which is connected to the outlet opening 119. The final edge of the valve sleeve 130' on the inner circumference 121C' of the valve sleeve 130' marks the control edge of the closing mechanism in the valve sleeve 130' working together with the transitional edge 140 and the shaft section 122 of the valve closing body 120. The partial section 121C of the axial boring 121 is formed from the inner circumference of the valve sleeve 130, 130' by the use of the valve sleeves 130, 130' and a two-part valve case. Since the valve sleeves 130, 130' have both the sealing seat 131 and also the fixed part of the second closing mechanism, if wear occurs the sealing function of both major seals of the pilot control valve can again be established by the exchange of a component.

Figure 6:
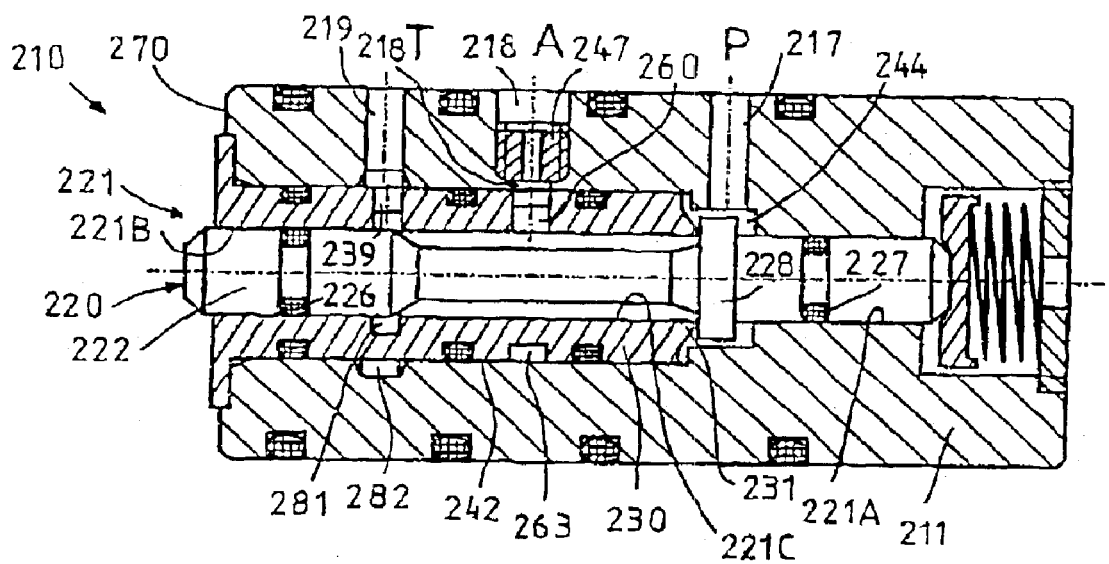
FIG. 6 shows a cross-sectional view of a pilot control valve according to a third embodiment with a single part valve case.
Figure 7:
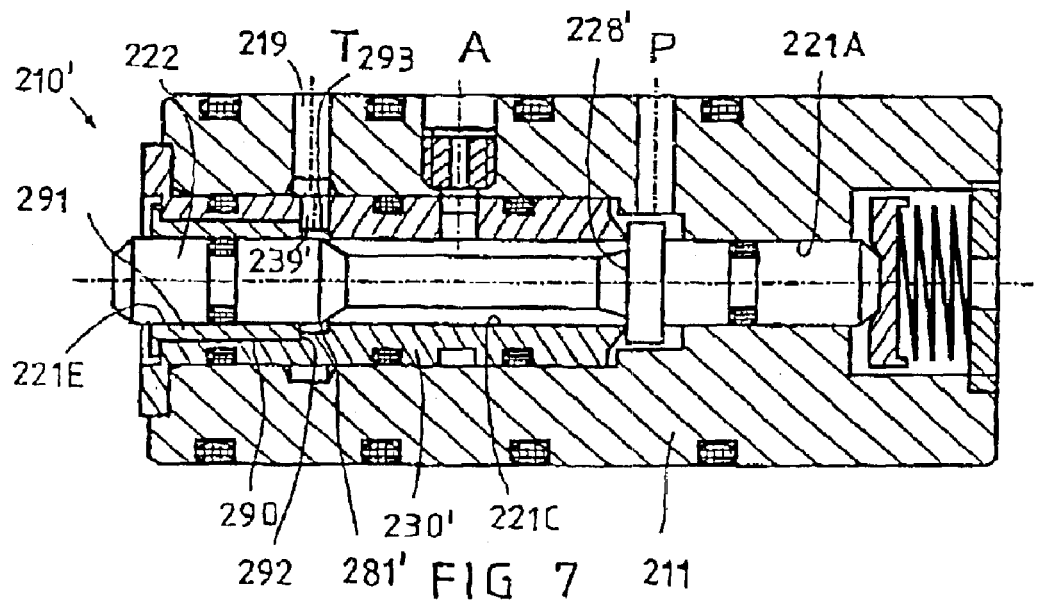
FIG. 7 shows a cross-sectional view of an alternative embodiment for a pilot control valve with a single part valve case.

FIG. 6 shows an embodiment of a pilot control valve 210 with a single case part 211 forming the cartridge. Here also the valve closing body 220 has an identical construction as in the embodiments in FIGS. 1, to 3 so that a description of the valve closing body 220 is not necessary. The valve sealing seat 231 which works together with the collar 228 on the valve closing body 220 from the end face 270 in the pre-space 244 is a component of a valve sleeve 230 which is pushed into a blind stepped boring 242 in the case part 211, which in the assembled condition abuts the case of the switching device and extends out from the valve accepting boring. The radial opening 239, which forms the static part of the second closing mechanism, comprises here a radial boring in the cover 280 of the valve sleeve 230 and a circulating groove 281 formed on the inner circumference 221C of the valve sleeve 230 and aligned with the radial opening 239. The blind hole boring 242 in the single case part 211 has correspondingly at the same height as the radial boring 239 and the circulating groove 281 a ring groove 282, which is in connection with the exit opening 219 to the return flow T. For the flow to the user connection A the valve sleeve 230 has at the height of the connection opening 118 a radial boring 260 and a ring groove 263. Here also as in the previous embodiments a throttle 247 can be inserted in the connecting opening 118 so as to be able to change the effective bore of the pilot control valve. The embodiment shown in FIG. 6 differs further from the previous embodiments in that the shaft section 222 is guided not in a section of the axial boring within a case part but in the boring section 221B on the inner surface of the valve sleeve 230. For this embodiment it therefore offers the advantages of integration of the seals 226, 227 in the valve pusher 220. The boring sections 221C and 221B end individually at the radial opening 239 or the groove 281. Because of the single part valve case 211 assembly errors can hardly arise in the pilot control valve cartridge 210, which is put together, from very few parts. FIG. 7 shows an alternative embodiment 210' for a pilot control valve with assembled part valve case part 211. In contrast to the embodiment in FIG. 6, in which a circulating groove 281 on the inner circumference of the valve sleeve 230 has to be turned out, the valve sleeve 230' has a stepped extension 290 in which a valve sleeve insert 291 is screwed or pressed in so as to form the circulating groove 281' between the end 292 of the valve sleeve insert 291 and the base 293, which again is connected with the outlet opening 219 and the return flow T via the radial boring 239'. The boring section 221E of the axial boring 221 is here consequently formed from the inner side of the sleeve insert 291 and the shaft section 222 is guided on this boring section 221E. The blind boring for driving out the valve insert 230, 230' is not shown.

From the foregoing description a range of modifications present themselves to a man skilled in the art, which fall within the range of protection of the attached claims. A throttle blind screwed into the connecting opening of the load connector forms the preferred embodiment for changing the effective nominal cross section of the pilot control valve according to the invention. Alternatively instead of one throttle there also can be one throttle in the inlet opening and the outlet opening or any desired combination of flow resisters can be provided. Instead of a throttle a blind or similar could be used. Further the number and the arrangement of the sealing rings between the individual components and the number of the blind borings can be varied within limits whereby such and other modifications fall in the area of the protection of the claims, insofar as with a single valve closing body, two different closing mechanisms for the multi way valve are realised. Further, the valve according to the present invention cannot only be applied as a pilot control valve but also as a main control valve for low pressures of the fluid to be controlled or switched.

What is claimed is:

1. A pilot control valve especially for use in mining hydraulics with a valve insert configured as a valve cartridge which can be arranged in a valve accepting boring of a valve block forming a multi-way valve whose valve housing has an inlet for pressure fluid, a connecting opening for a load, an outlet opening into a return feed and an axial boring for the acceptance of a valve closing body provided with a sealing surface, which can be lifted by means of a switching device fixed to the valve housing, against the return force of a spring from a valve sealing seat arranged between an inlet opening and the connecting opening, whereby with the lifting movement of the valve closing body from the valve sealing seat an at least two part closing mechanism arranged between the connecting opening and the outlet opening is coupled for their separation wherein a single part valve closing body has a closing surface and a moving part of the closing mechanism, whereby the moving part comprises a shaft section of the valve closing body which plunges with the lifting movement into a boring section of the axial boring, closing a radial opening.

2. A pilot control valve according to claim 1, in which the valve closing body has a ring shaped collar whose rear side facing the valve seal seat forms the closing surface or the support surface for a sealing body.

3. A pilot control valve according to claim 2, in which the collar is equipped with an additional seating material on its rear side.

4. A pilot control valve according to claim 1, in which the shaft section forms one end of the valve closing body, and a pin section forms the other end of the valve closing body, whereby the pin and shaft sections have the same diameter and form guiding surfaces of the valve closing body in the boring sections of the axial boring.

5. A pilot control valve according to claim 2, in which the valve closing body has a diameter reducing cut-out with a conical transition section to the shaft section and/or the collar between the collar and the shaft section forming the moving part of the closing mechanism.

6. A pilot control valve according to claim 1, in which the valve sealing seat is a component of an exchangeable valve sleeve inserted, especially pressed, into blind boring extensions of the axial boring.

7. A pilot control valve according to claim 6, in which the internal diameter of the valve sleeve at the valve sealing seat has essentially the same diameter as the shaft section and a pin section and forms the inner side of the valve sleeve sections of the axial boring.

8. A pilot control valve according to Claim 1, in which a valve case comprises a single case part with a stepped blind hole, in which a valve sleeve is inserted, a sleeve end of which inserted into the blind hole forms the valve sealing seat, forms sections of the axial boring with its inside and has the radial opening between two boring sections, whereby preferably the radial opening opens into a circulating groove in the inner side of the valve sleeve.

9. A pilot control valve according to claim 8, in which the valve sleeve is made stepped on the inside and the circulating groove is formed by means of an inserted valve sleeve insert in the steps of the valve sleeve.

10. A pilot control valve according to claim 1, in which a valve case comprises a first case part and a second case part joined which is provided with a stepped blind hole, in which from the separation plane between the first and second case parts a valve sleeve is inserted, whose free end forms the valve sealing seat and between its other end and a stepped section of the blind hole forms a radial opening by means of gap openings at a sleeve end.

11. A pilot control valve according to claim 1, in which a valve case comprises a first case part and a second case part joined which is provided with a stepped blind hole extension, in which from the separation plane between the first and second case parts a valve sleeve is inserted, whose free end forms the valve sealing seat, whereby the extension of the length between a ring shoulder and the base of the sleeve is shorter than the stepped blind hole extension.

12. A pilot control valve according to claim 1, in which a valve case comprises a first, a second and a third case part with a first separation plane between the first and the second and a second separation plane between the second and the third case parts, whereby the second case part is provided with a stepped blind hole extension, into which a free sleeve end of the valve sleeve forming the valve sealing seat is inserted.

13. A pilot control valve according to claim 12, in which a radial opening is formed from an intermediate gap at the second separation plane.

14. A pilot control valve according to claim 1, in which a valve case comprising at least one part and in which at least one of the case parts has at least one decentral through boring for driving out a valve sleeve.

15. A pilot control valve according to claim 1, in which at least one flow resistance for the fluid connected in series with the valve sealing seat and the closing mechanism to change the effective nominal bore of the pilot control valve.

16. A pilot control valve according to claim 12, in which a flow resistance comprises a throttle or a shutter, whereby a single throttle or a shutter is associated with at least one load connection or a combination of these connections.

17. A pilot control valve according to claim 15, in which the throttle or shutter is inserted at a distance from the valve closing body in a boring in a cover forming a load connection, in a valve case.

18. A pilot control valve according to claim 1, in which the switching device is an electro-magnetic or piezo-electric actuator, whereby preferably the valve insert is retained in the valve accepting boring in the valve block by means of the switching device.

19. A pilot control valve according to claim 1, in which in a multi-part valve case the boring sections of the axial boring form guide and bearing sections for shaft and pin sections are provided in each outer case part with an accepting groove for a sealing ring.

* * * * *